Patented Feb. 4, 1930

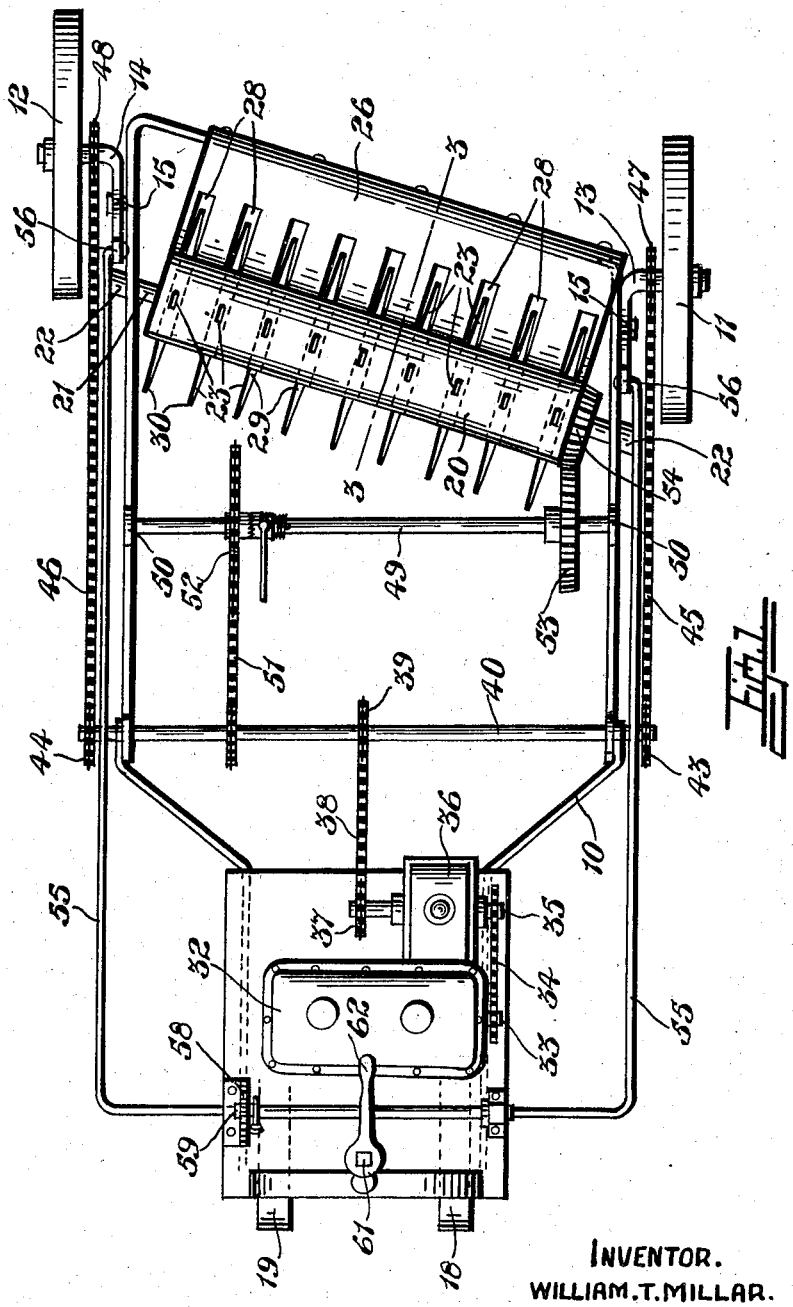

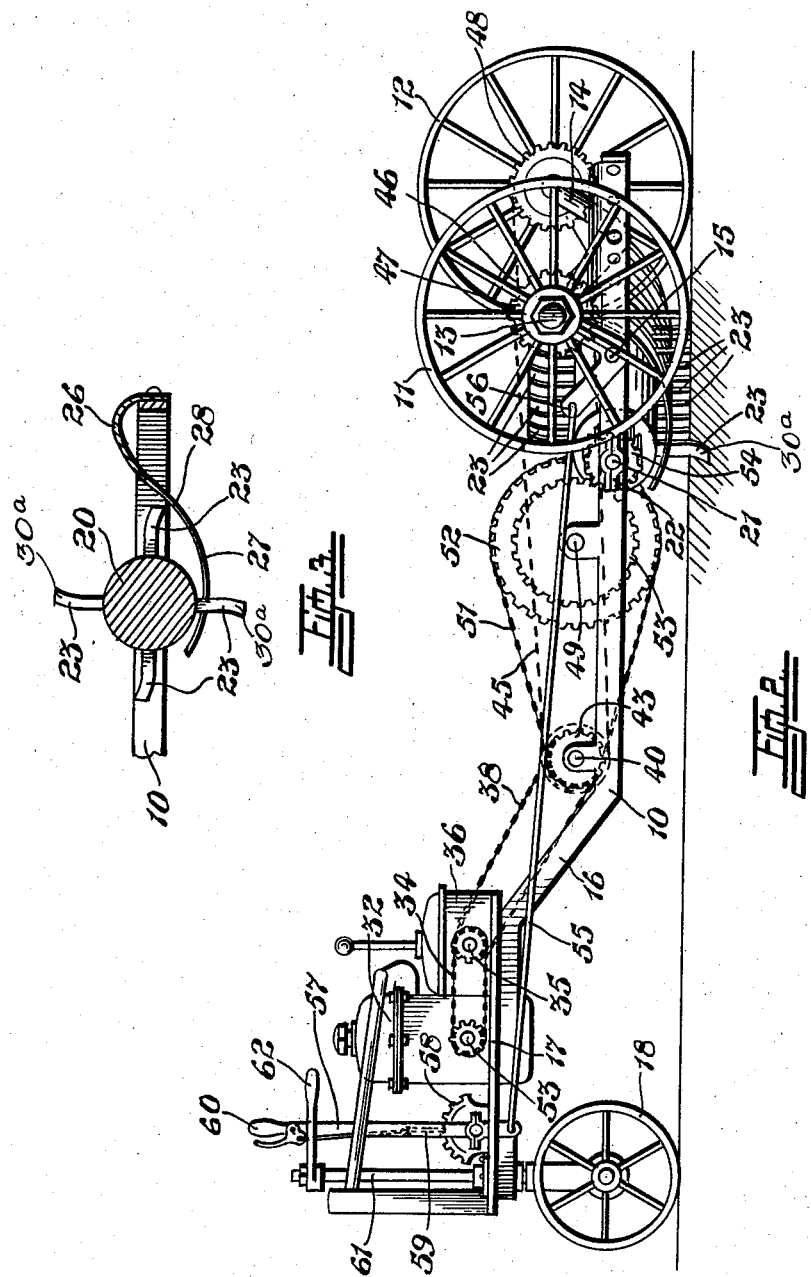

1,745,903

UNITED STATES PATENT OFFICE

WILLIAM THOMAS MILLAR, OF ARNPRIOR, ONTARIO, CANADA

WEED ERADICATOR

Application filed December 7, 1925. Serial No. 73,797.

This invention relates to improvements in weed eradicators, and the objects of the invention are to provide a durable, simply constructed agricultural machine of this description for the destruction of weeds and the like and designed at the same time to be automatically kept clean.

Further objects are the provision of a machine of this description that can be manufactured and placed on the market at a very reasonable price.

With the foregoing and other objects in view, hereinafter more fully referred to, the invention consists essentially in the combination with a wheel supported frame, of a drum rotatably and adjustably mounted therein and provided with a plurality of weed eradicating members suitably arranged in and protruding therefrom and having rigidly mounted adjacent thereto a cleaning screen in the form of a plate with slots therein adapted to engage with the spikes or weed eradicating members on the drum when the latter is operated and whereby these weed eradicating spikes or teeth are kept free of weeds and other material collected by them in their travel. In short, the slotted screen or plate member, as the tooth-carrying drum rotates and takes up the weeds and other rubbish, clears the teeth of same as it passes through the slots in the plate, causing it to be deposited on the surface of the ground for collection. The machine is operated in any well known manner as hereinafter more fully described.

Referring now to the drawings, in which like characters of reference indicate corresponding parts in each figure:

Figure 1 is a plan view of my improved machine,

Figure 2 is a side elevation,

Figure 3 is a section on line 3—3 of Figure 1.

Referring more particularly to the drawings, in which a preferred example of my improved machine is shown, 10 designates a suitable frame supported on wheels 11 and 12 in turn provided with stub axles 13 suitably bent at 14 and adjustably mounted as at 15 on the frame 10. The frame 10, due to mounting on the bent stub axles, is designed to fit low between the wheels 11 and 12 while the front portion is bent as at 16 and raised upwardly to form a platform 17 which is supported by guide wheels 18 and 19.

The essential feature of my invention, as already mentioned, comprises the weed eradicating member in the form of a drum 20 mounted on a slantwise extending shaft 21 in suitable bearings 22 in the frame 10. This drum is provided with a plurality of spikes or teeth 23 spaced from one another and arranged in series, also spaced from one another around the periphery of the drum and the individual members of which are in staggered relationship to the members of the adjacent series, forming, when in operation, a drum of continuous teeth or spikes. On the slantwise end 25 spaced from and parallel with the drum-carrying shaft 21 is rigidly mounted a suitable curved screen member or plate 26 extending in curved formation as at 27 beneath the drum and formed with a plurality of spaced slots 28 through which the teeth or prongs 23 engage or pass when the drum is being rotated. These teeth are of greater thickness at their inner ends 29 than at the outer or pointed ends 30 and are tapered outwardly to a point so that when they pass through the slots 28 the thicker or inner ends of these teeth almost contact with the side of the slots while the end portions or extremities thereof are curved as indicated at 30$^a$. In this manner any collection of weeds or other material to be eradicated which is dug up and caught on the teeth when the drum is in operation is more or less carried by them until they reach the series of slots corresponding to the series of said teeth and in passing through these slots the material carried on the teeth is removed without clogging the machine and permitted to drop on the ground evenly and to be readily collected afterwards. It will thus be seen that my improved drum with curved teeth and the cleaning plate or screen in connection therewith provide not only for the eradication of rubbish and weeds from land but also for the collection of it in suitable form from the surface of the land and enable it to be readily removed therefrom.

For operating the device I provide on the platform 17 a motor 32 of any well known construction, the shaft 33 of which is connected by the chain 34 to the shaft 35 of the transmission or gear box 36, the opposite end of the shaft 36 being in turn provided with a gear 37 connected by a chain 38 to a sprocket 39 on the main driving shaft 40 mounted in suitable bearings in the frame and protruding on each side therebeyond to carry sprockets 43 and 44 keyed thereon and connected by chains 45 and 46 to sprockets 47 and 48 on the stub axles 13 and 14 whereby the wheels mounted thereon are rotated. For simultaneously operating the drum-carrying shaft 21 I provide a counter-shaft 49 parallel with and spaced from the shaft 40 and suitably mounted at 50 in the frame 10. This counter-shaft is also chain- and sprocket-connected as at 51 and 52 to the main driving shaft 40 and has keyed thereon a gear 53 designed to mesh with a beveled gear 54 keyed on the shaft 21 to rotate the latter. I also provide means for raising and lowering the drum-carrying shaft 21, which consists of rods 55 suitably bent and connected at one end at 56 to the stub axles 13. The other ends of these rods are connected to a pivotally mounted lever 57 provided with a suitable rack 58, dog 59 and lever-operating handle 60, the lever protruding above the platform and operable therefrom. The machine is guided in any required direction by means of the standard 61 with handle 62 operatively connected to the wheels 18 and 19.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

A cultivator for the eradication of weeds and the like, comprising in combination, a wheel-supported frame having an upwardly and inwardly stepped front portion forming a raised platform, raising and lowering means for said frame controlled from said platform, a motor on said platform, a drive shaft on the frame adjacent said platform driven from the motor, driving means between the drive shaft and the rear frame wheels for driving the cultivator, a counter shaft on said frame and drive means connected therewith from the drive shaft, a rotatable cylinder diagonally mounted on said frame, formed with transversely spaced radially extending teeth with curved extremities, a gear for rotating said cylinder in mesh with a gear on the counter shaft, and a cleaner member in the form of a substantially S shaped rigidly mounted plate adjacent and in spaced relationship to the cylinder and provided with a plurality of slots registering with and selectively engaging said teeth on the cylinder whereby material adhering to said teeth is automatically cleaned on the teeth engaging with said slots.

In witness whereof I have hereunto set my hand.

WILLIAM THOMAS MILLAR.